US012626211B2

(12) United States Patent
Chen et al.

(10) Patent No.: US 12,626,211 B2
(45) Date of Patent: May 12, 2026

(54) SYSTEMS AND METHODS FOR LAST-MILE DELIVERY ASSIGNMENT

(71) Applicant: Walmart Apollo, LLC, Bentonville, AR (US)

(72) Inventors: Xi Chen, Sunnyvale, CA (US); Minghui Liu, San Bruno, CA (US); Yiren Ye, Sunnyvale, CA (US); Hengchao Wang, Santa Clara, CA (US); Yuan Wang, San Francisco, CA (US); Jing Huang, San Jose, CA (US); Mingang Fu, Palo Alto, CA (US); Mohit Agarwal, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 325 days.

(21) Appl. No.: 18/092,052

(22) Filed: Dec. 30, 2022

(65) Prior Publication Data

US 2024/0220911 A1    Jul. 4, 2024

(51) Int. Cl.
| | |
|---|---|
| *G06Q 10/083* | (2024.01) |
| *G06Q 10/08* | (2024.01) |
| *G06Q 50/47* | (2024.01) |

(52) U.S. Cl.
CPC ........... *G06Q 10/083* (2013.01); *G06Q 10/08* (2013.01); *G06Q 50/47* (2024.01)

(58) Field of Classification Search
CPC ....... G06Q 10/083; G06Q 50/47; G06Q 10/08
See application file for complete search history.

(56) References Cited

U.S. PATENT DOCUMENTS

| | | |
|---|---|---|
| 11,210,712 B2 | 12/2021 | Zhang et al. |
| 2005/0246192 A1* | 11/2005 | Jauffred ........... G06Q 10/08355 |
| | | 705/13 |

(Continued)

FOREIGN PATENT DOCUMENTS

| | | |
|---|---|---|
| CN | 104346926 B | 9/2017 |

OTHER PUBLICATIONS

Javier Morales Sarriera, To Share or Not to Share: Investigating the Social Aspects of Dynamic Ridesharing, 2017, p. 109-111 ( Year: 2017).*

(Continued)

*Primary Examiner* — Ibrahim N El-Bathy
(74) *Attorney, Agent, or Firm* — Morgan, Lewis & Bockius LLP; Manita Rawat

(57)    ABSTRACT

Systems and methods of route optimization are disclosed. An adjustment engine receives a plurality of driver-trip pairs each including a driver selected from a plurality of drivers and a trip selected from a plurality of trips and determines a weight for each of the driver-trip pairs. The weight is determined based on at least one driver-trip feature, at least one driver feature, and at least one trip feature. A route optimization engine selects a set of optimal driver-trip pairs based on a bipartite matching process including the weight for each of the driver trip pairs. The set of optimal driver-trip pairs minimizes total estimated time of arrival to a pickup location for each trip in the plurality of trips. Trip data is transmitted to a corresponding device associated with a corresponding driver paired with each trip in the set of optimal driver-trip pairs.

20 Claims, 11 Drawing Sheets

(56) References Cited

U.S. PATENT DOCUMENTS

| | | |
|---|---|---|
| 2009/0300547 A1 | 12/2009 | Bates et al. |
| 2011/0137776 A1 | 6/2011 | Goad et al. |
| 2014/0222506 A1 | 8/2014 | Frazer et al. |
| 2015/0032508 A1 | 1/2015 | Lotlikar et al. |
| 2016/0063065 A1 | 3/2016 | Khatri et al. |
| 2016/0188725 A1 | 6/2016 | Wang et al. |
| 2016/0217515 A1 | 7/2016 | Vijayaraghavan et al. |
| 2017/0097741 A1 | 4/2017 | Liang et al. |
| 2017/0124465 A1 | 5/2017 | Yang et al. |
| 2017/0193450 A1* | 7/2017 | Potratz ............. G06F 16/24575 |
| 2018/0131655 A1 | 5/2018 | Carbune et al. |
| 2019/0095849 A1 | 3/2019 | Sweeney et al. |
| 2019/0138656 A1 | 5/2019 | Yang et al. |
| 2019/0325374 A1* | 10/2019 | Pan ................. G06Q 10/06398 |
| 2020/0082315 A1 | 3/2020 | Crapis et al. |
| 2020/0342387 A1* | 10/2020 | Rajkhowa ............. B60W 40/09 |
| 2021/0103892 A1* | 4/2021 | Han ..................... G05D 1/0291 |
| 2021/0241292 A1 | 8/2021 | Pandey et al. |

OTHER PUBLICATIONS

Resulticks Solution, Inc., "Next-Best Experience Management," Source 1, (2022), 3 pages.
Resulticks Solution, Inc., "Next-Best Experience Management," Source 2, (2022), 3 pages.
Resulticks Solution, Inc., "Next-Best Experience Management," Source 3, (2022), 3 pages.
Resulticks Solution, Inc., "Next-Best Experience Management," Source 4, (2022), 3 pages.
Microsoft Corporation, "VeriPark Next Best Action," (2022), 4 pages.

* cited by examiner

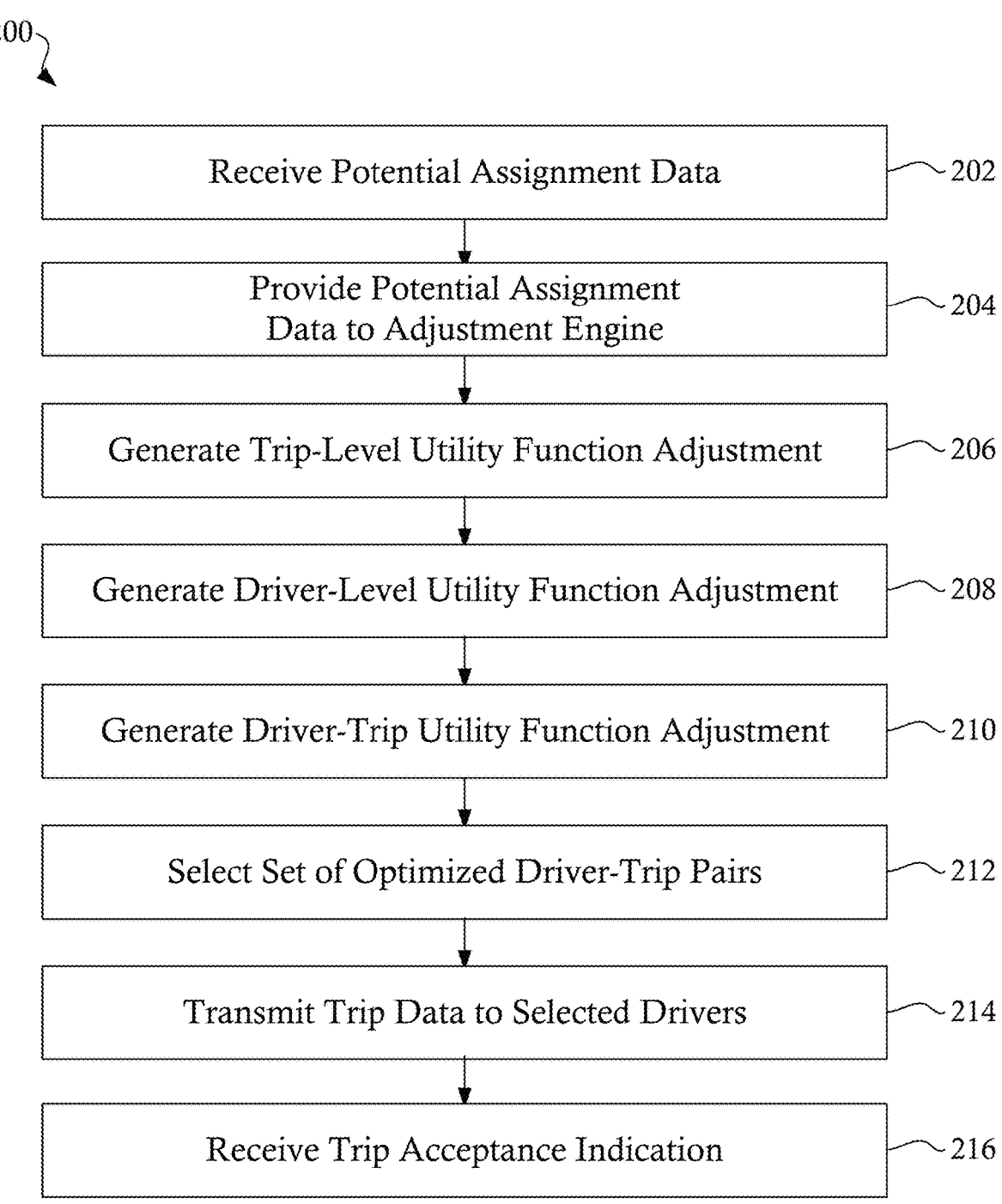

200

Receive Potential Assignment Data — 202

Provide Potential Assignment
Data to Adjustment Engine — 204

Generate Trip-Level Utility Function Adjustment — 206

Generate Driver-Level Utility Function Adjustment — 208

Generate Driver-Trip Utility Function Adjustment — 210

Select Set of Optimized Driver-Trip Pairs — 212

Transmit Trip Data to Selected Drivers — 214

Receive Trip Acceptance Indication — 216

FIG. 6

SYSTEMS AND METHODS FOR LAST-MILE DELIVERY ASSIGNMENT

TECHNICAL FIELD

This application relates generally to route assignment and, more particularly, to assignment engines configured to generate optimized assignments.

BACKGROUND

Driver matching for deliveries generated by an automated delivery system requires selection of the "right" driver for an order such that the driver accepts the order and completes the order. Some delivery management systems allow a customer to select a delivery window specifying a range of time when the goods may be delivered. Similarly, some delivery management systems allow delivery drivers to operate in a crowdsourced, or "gig," arrangement in which delivery drivers can choose when to be available for deliveries and can select only those deliveries they wish to perform.

Current systems use a cascading assignment method that provides potential orders to potential drivers using various mechanism based on, for example, time remaining until a delivery window. However, such systems do not ensure drivers will select presented deliveries or minimize travel distances for all drivers. Failure to provide desired deliveries or optimal solutions can result in, for example, goods spoiling before delivery or delivery delays due to vehicles being selected that do not provide an optimal solution for routing current deliveries. This may have a cascading effect on subsequent deliveries, potentially missing promised delivery windows on other orders on the delivery schedule.

SUMMARY

In various embodiments, a system including a non-transitory memory, a transceiver configured to receive potential assignment data comprising data representative of a plurality of drivers and a plurality of trips, and an adjustment engine configured, and a route optimization engine are disclosed. The adjustment engine is configured to receive a plurality of driver-trip pairs each including a driver selected from the plurality of drivers and a trip selected from the plurality of trips and determine a weight for each of the driver-trip pairs. The weight is determined based on at least one driver-trip feature, at least one driver feature, and at least one trip feature. The route optimization engine is configured to select a set of optimal driver-trip pairs from the plurality of driver-trip pairs based on a bipartite matching process including the weight for each of the driver-trip pairs and transmit trip data for each trip in the plurality of trips to a corresponding device associated with a corresponding driver paired with each trip in the set of optimal driver-trip pairs. The set of optimal driver-trip pairs minimizes a total estimated time of arrival to a pickup location for each trip in the plurality of trips.

In various embodiments, a computer-implemented method includes steps of: receiving, via a transceiver, potential assignment data comprising data representative of a plurality of drivers and a plurality of trips; receiving, at an adjustment engine, a plurality of driver-trip pairs each including a driver selected from the plurality of drivers and a trip selected from the plurality of trips; determining, by the adjustment engine, a weight for each of the driver-trip pairs; selecting, by a route optimization engine, a set of optimal driver-trip pairs from the plurality of driver-trip pairs based on a bipartite matching process including the weight for each of the driver-trip pairs; and transmitting, via the transceiver, trip data for each trip in the plurality of trips to a corresponding device associated with a corresponding driver paired with each trip in the set of optimal driver-trip pairs. The weight is determined based on at least one driver-trip feature, at least one driver feature, and at least one trip feature. The set of optimal driver-trip pairs minimizes a total estimated time of arrival to a pickup location for each trip in the plurality of trips.

In various embodiments, a non-transitory computer-readable medium having instructions stored thereon is disclosed. The instructions, when executed by at least one processor, cause a device to perform operations including: receiving, via a transceiver, potential assignment data comprising data representative of a plurality of drivers and a plurality of trips; receiving, at an adjustment engine, a plurality of driver-trip pairs each including a driver selected from the plurality of drivers and a trip selected from the plurality of trips; determining, by the adjustment engine, a weight for each of the driver-trip pairs; selecting, by a route optimization engine, a set of optimal driver-trip pairs from the plurality of driver-trip pairs based on a bipartite matching process including the weight for each of the driver-trip pairs; and transmitting, via the transceiver, trip data for each trip in the plurality of trips to a corresponding device associated with a corresponding driver paired with each trip in the set of optimal driver-trip pairs. The weight is determined based on at least one driver-trip feature, at least one driver feature, and at least one trip feature. The set of optimal driver-trip pairs minimizes a total estimated time of arrival to a pickup location for each trip in the plurality of trips.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 6 is a flowchart illustrating a method of generating optimized route assignments for a plurality of driver-trip pairs, in accordance with some embodiments.

DETAILED DESCRIPTION

Figure 1:
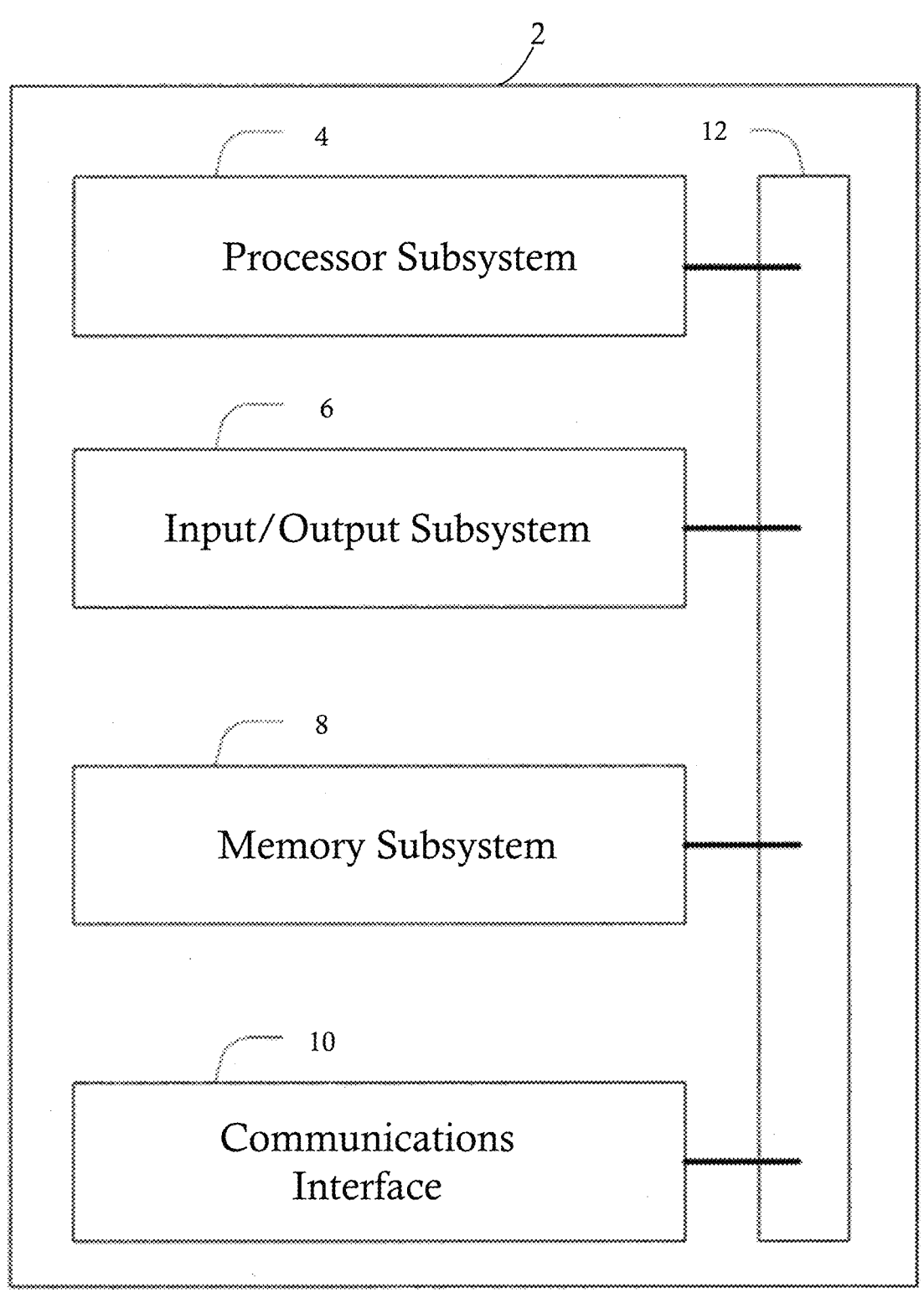
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for implementing an optimized assignment pipeline configured to generate optimized route solutions based on modified estimated times of arrival. A time of arrival estimate for a selected driver-trip pair can be adjusted by one or more engines or modules based on one or more features, such as, for example, driver historical behavior features and/or driver real-time behavior features. For example, one or more ETA adjustments can be determined based on driver historical behavior features and/or driver real-time behavior features and added to each potential route for a driver, e.g., each driver-trip pair, prior to optimization of routes by an optimization engine.

In some embodiments, a set of driver features, such as a set of driver historical behavior features and/or a set of driver real-time behavior features can be provided to one or more ETA adjustment engines configured to implement a trained machine learning model to generate an ETA adjustment based on the received set of features. In some embodiments, each ETA adjustment engine and/or trained machine learning model is configured to adjust one or more weights of a driver-trip ETA algorithm configured to calculate a driver-trip ETA.

In some embodiments, systems and methods for generating optimized route assignments based on modified ETAs includes one or more adjustment engines configured to generate ETA adjustments based on one or more driver features, trip features, and/or driver-trip features. Although specific embodiments are discussed herein, it will be appreciated that any suitable features can be used to generate ETA adjustments based on driver-trip inputs.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a neural network which is trained (e.g., configured or adapted) to generate an ETA adjustment, is disclosed. A neural network trained to generate an ETA adjustment may be referred to as a trained ETA adjustment model. The trained ETA adjustment model can be configured to calculate a specific ETA adjustment and/or a weight for insertion into an ETA algorithm configured to generate a driver-trip total ETA.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-ni-tride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating optimized route assignments based on adjusted ETAs, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
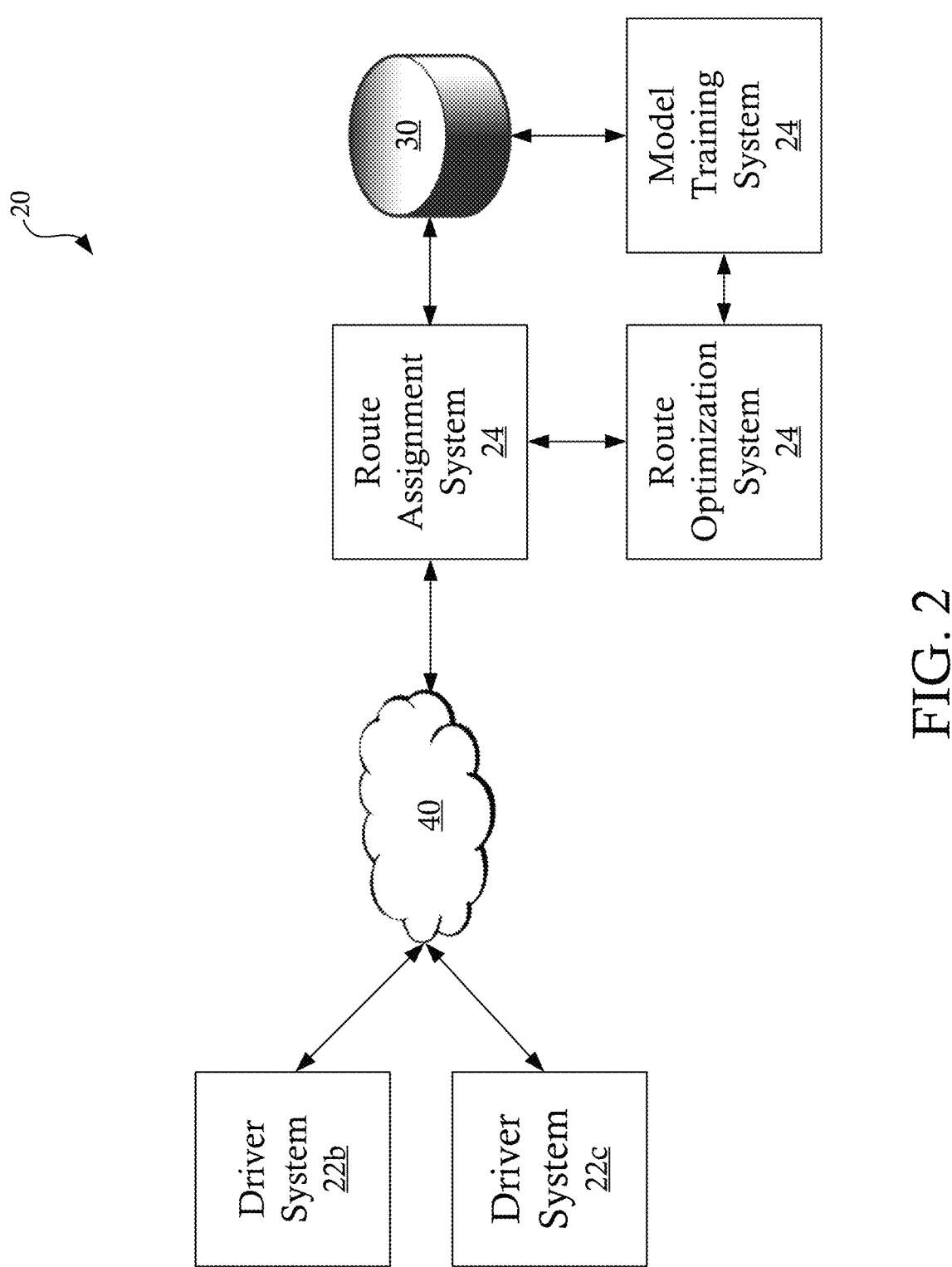
FIG. 2 illustrates a network environment configured to provide optimized assignments based on an optimized matching pipeline, in accordance with some embodiments.

FIG. 2 illustrates a network environment 20 configured to provide optimized assignments based on an optimized matching pipeline, in accordance with some embodiments. The network environment 20 includes a plurality of systems configured to communicate over one or more network channels, illustrated as network cloud 40. For example, in various embodiments, the network environment 20 can include, but is not limited to, at least one driver system 22a-22b, at least one route assignment system 24, at least one route optimization system 26, and at least one model training system 28. Although specific embodiments are illustrated herein, it will be appreciated that one or more of the illustrate systems, for example the route assignment system 24, the route optimization system 26, and/or the model training system 28, can be combined into a single system. Similarly, it will be appreciated that any one of the illustrated systems can be separated into multiple systems operating in series and/or parallel. Finally, it will be appreciated that illustrated systems can be omitted from and/or additional systems can be added to the network environment 20, and such modifications are within the scope of this disclosure.

In some embodiments, each of the driver systems 22a, 22b is associated with a driver available for one or more deliveries. In some embodiments, drivers operate in a crowdsourced, or "gig," environment in which drivers, through an associated driver system 22a, 22b, log into a network environment configured to provide delivery route assignments and receive/select delivery routes for completion. In some embodiments, a driver can select a single delivery assignment at a time, e.g., drivers are matched to routes on a one-to-one basis.

Each driver identifier is associated with driver data representing historical data collected for the driver. Historical data can include, but is not limited to, trip completion data, trip cancellation data, trip ETA data, actual travel time data, driver ranking data, driver rating data, and/or any other suitable historical data. Historical data can be stored as one or more data structures within one or more data storage elements, such as, for example, a historical database 30.

In some embodiments, each of the driver systems 22a, 22b is configured to generate real-time data related to current activities for the driver. Real-time data can include, but is not limited to, current trip information, driver status, availability , and/or any other suitable real-time data. Real-time data can be stored as one or more data structures within one or more data storage elements, such as, for example, a real-time database 32.

In some embodiments, each of the driver systems 22a, 22b is in data communication with a route assignment system 24. The route assignment system 24 is configured provide an interface to a network environment, such as a driver assignment network environment, and provide data to one or more driver systems 22a, 22b. For example, in some embodiments, the route assignment system 24 is configured to provide route assignments within a predetermined zone to each of the currently active driver systems 22a, 22b associated with the predetermined zone.

As used herein, the term "zone" refers to a delineation of a geographic area. A zone can correspond to a predefined geographic area, such as a politically defined geographic area (e.g., country, state, municipality, etc.,), a naturally defined geographic area, and/or any other geographic area. In some embodiments, one or more zones include predefined geographic areas that correspond to delivery areas and may not correspond to any other existing geographic delineation. For example, in some embodiments, a zone can include a neighborhood or part of a neighborhood within a city, portions of one or more counties within a state, and/or any other defined delivery/geographic area.

In some embodiments, the route assignment system 24 includes a route assignment engine configured to implement a multi-step, or multi-stage, route assignment process. For example, in some embodiments, the route assignment engine is configured to implement a multi-stage delivery process including a round-robin stage, a broadcast stage, a broadcast surge stage, and/or a third-party assignment stage. Although specific embodiments are discussed herein, it will be appreciated that a route assignment engine can be configured to implement any suitable route assignment process.

In some embodiments, a round robin assignment stage is configured to generate one-to-one driver-to-trip assignments, or recommendations. For example, in some embodiments, for each trip in a set of trips, a driver is selected from the set of available drivers (e.g., the set of currently available driver systems 22a, 22b). A specific trip is assigned to a specific driver and provided to the driver system 22a, 22b by the route assignment system 24. A driver, through the driver system 22a, 22b, can select or decline an assigned trip provided by the route assignment system 24. A round robin stage can include multiple sub-stages of round robin driver-trip assignment. For example, if a driver declines (or fails to accept) a suggested delivery during a first round robin sub-stage, both the driver and the delivery can be provided to a second round robin sub-stage. The second round robin sub-stage can suggest a different route to the driver and can suggest the original route to a different driver. It will be appreciated that any suitable number of round robin sub-stages can be implemented by the route assignment system 24.

If a route is not assigned at a round robin stage, the route assignment system 24 can transition to a broadcast stage. At the broadcast stage, the route assignment system 24 transmits all available routes to all available drivers, allowing drivers to select a desired route from among the full list of routes. If a route is not selected during the broadcast stage, the route assignment system 24 can transition to a broadcast surge stage. At the broadcast surge stage, the route assignment system 24 transmits all available routes to all available drivers and increases a reward, e.g., a monetary payment, for each still pending route. Finally, if a route remains unassigned after the broadcast surge stage, the route assignment system 24 can transition to a third-party stage and can assign each still pending route to a third-party delivery service, typically at an increased cost above the broadcast surge cost of the trip. A system and method of delivery assignment is described in greater detail in U.S. Pat No. 11,282,027, issued Mar. 22, 2022 and entitled "System and Method of Delivery Assignment," which is incorporated herein by reference in its entirety.

In some embodiments, at the round-robin stage, the route assignment system 24 is configured to generate a set of optimal route assignments and provide individual route assignments to driver systems 22a, 22b. The optimal route assignments can include driver-trip pairs that associate a driver system 22a, 22b, and a driver associated with the driver system 22a, 22b, with a specific delivery route within a delivery zone. In some embodiments, the route assignment system 24 is configured to optimize route assignments within one or more zones based on estimated time of arrival (ETA) data for each driver-trip pair. Optimization of route assignments can be based on, for example, ETA data for each possible driver-trip pair within a specific zone. For example, in some embodiments, adjusted ETA data for each possible driver-trip pair within a zone is generated and the route optimization system 26 implements a route optimization engine to generate a set of optimal driver-trip pairings. In some embodiments, the set of optimal driver-trip pairings provide one-to-one matching between currently available driver systems 22a, 22b and currently pending routes or trips.

In some embodiments, the route optimization engine is configured to implement a route optimization process that optimizes driver-trip pairings for one or more features, such as, for example, total estimated travel time for all assigned deliveries. In some embodiments, the route optimization engine receives a set of ETA data for each potential driver-trip pairing and implements a process configured to minimize the total sum of the ETAs for each selected driver-trip pair. Although embodiments are discussed herein including minimization of ETA cost, it will be appreciated that other optimizations such as individual trip ETA, total travel time, and/or other factors related to the calculated ETA for each driver-trip pair can be optimized by the route optimization system 26.

In some embodiments, driver-trip ETA is based on an estimated time of travel from a driver's current position to a pickup location. For example, in some embodiments, a first order is fulfilled (e.g., picked and prepared) at a first fulfillment location. Regardless of what driver is assigned to or selects the delivery, the assigned driver must first proceed to the first fulfillment location, i.e., the pickup location, to pickup the order before proceeding to the delivery location. Thus, when optimizing route assignments, a route optimization engine can ignore the travel time from the pickup location to the delivery location. Although certain embodiments discussed herein focus only on ETA of a driver to a pickup location, it will be appreciated that the disclosed systems and methods can similarly apply to any ETA (e.g., ETA of a driver for a complete trip, ETA of a delivery from a fixed point, etc.).

In some embodiments, the route optimization system 26 is configured to implement one or trained machine learning models. For example, the route optimization system 26 can be configured to implement a trained driver affinity model, a trained real-time adjustment model, a trained route optimization model, and/or any other suitable trained models. Each of the trained models can be configured to receive one or more inputs, such as feature inputs, and generate one or more outputs, such as ETA adjustments and/or optimized route assignments. In some embodiments, a trained route optimization model is configured to receive a set of driver-trip pairs each having an ETA element storing an adjusted ETA for the driver-trip pair. The adjusted ETA includes an ETA having one or more adjustments generated by one of the trained driver affinity model and/or the trained real-time monitoring model.

Figure 3A:
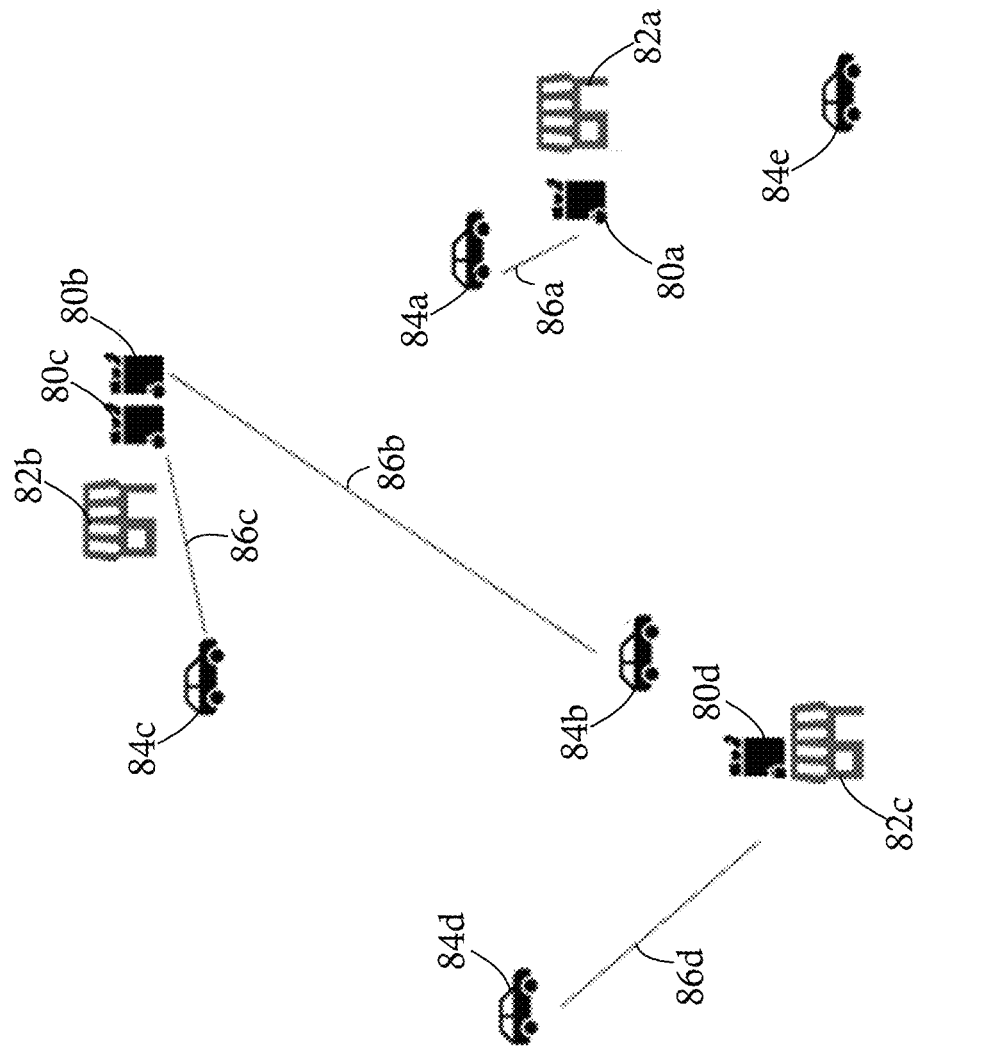
FIG. 3A illustrates a non-optimized route assignment for a set of drivers and a set of trips.
Figure 3B:
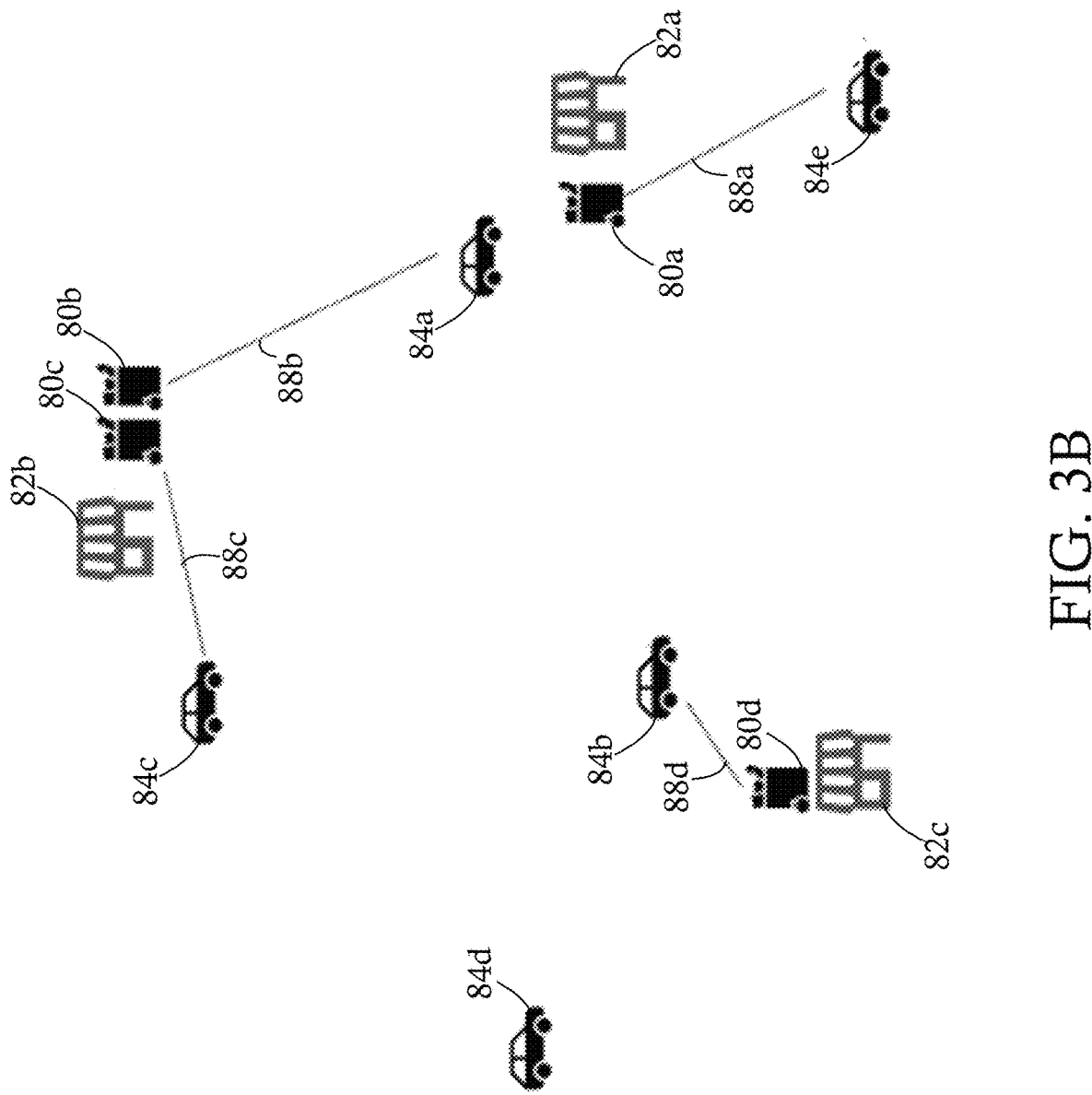
FIG. 3B illustrates an optimized route assignment for the set of drivers and the set of trips of FIG. 3A, in accordance with some embodiments.

FIGS. 3A and 3B illustrate a route optimization process, in accordance with some embodiments. As shown in FIG. 3A, a first set of deliveries 80a-80d are fulfilled and processed for delivery at one of three fulfillment locations 82a-82c. For each of the four deliveries, a driver 84a-84d is selected from a set of available driers 84a-84e. Each assigned driver 84a-84d has an estimated time of arrival to the assigned pickup location, which can be referred to as a cost 86a-86d of the assigned driver-trip pair. In FIG. 3A, the cost 86a of a first delivery 80a and a first driver 84a is 3, the cost 86b of a second delivery 80b and a second driver 84b is 8, the cost 86c of a third delivery and a third driver 84c is 4, and the cost 86d of a fourth delivery 80d and a fourth driver 84d is 6, for a total cost of 21. In other words, the total ETA for all driver-trip pairs is 21 minutes.

FIG. 3B illustrates an optimized route assignment based on a route optimization process, as disclosed herein. As shown in FIG. 3B, a fifth driver 84e, who was previously unassigned in FIG. 3A, has been assigned to the first delivery 80a and the first driver 84a, who was previously assigned to the first delivery 80a, is now assigned to the second delivery 80b. Similarly, the second driver 84b, who was previously assigned to the second delivery 80b, is now assigned to the fourth delivery 80d and the fourth driver 84d, who was previously assigned to the fourth delivery 80d, is now unassigned. The third driver 84c remains assigned to the third delivery 80c. In FIG. 3B, a cost 88a of the first delivery 80a and a fifth driver 84e is 5, a cost 88b of the second delivery 80b and the first driver 84a is 6, a cost 88c of the third delivery and the third driver 84c is 4, and a cost 88d of the fourth delivery 80d and the second driver 84b is 2, for a total cost of 17. The total ETA for all driver-trip pairs is 17 minutes, a reduction of five minutes over the unoptimized assignments of FIG. 3A.

In some embodiments, the route optimization system 26, such as, for example, a route optimization engine, is configured to implement one or more trained models, such as trained driver affinity models, trained real-time monitoring models, and/or trained route optimization models. In some embodiments, the trained models can be generated by a model training system 28. The model training system 28 can be configured to implement one or more iterative training processes to generate trained machine learning models for deployment by the route optimization system 26. As discussed in greater detail below, a trained model can be generated by adjusting an untrained or previously trained model using a set of training data and an iterative training process. The training data can include any suitable data, such as historical and/or real-time driver data stored in databases 30, 32. In some embodiments, training data can include one or more feature inputs and one or more target reactions.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software.

In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peerpeer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub- modules or sub-engines, each of which can be regarded as a module/engine in its own right.

Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 4:
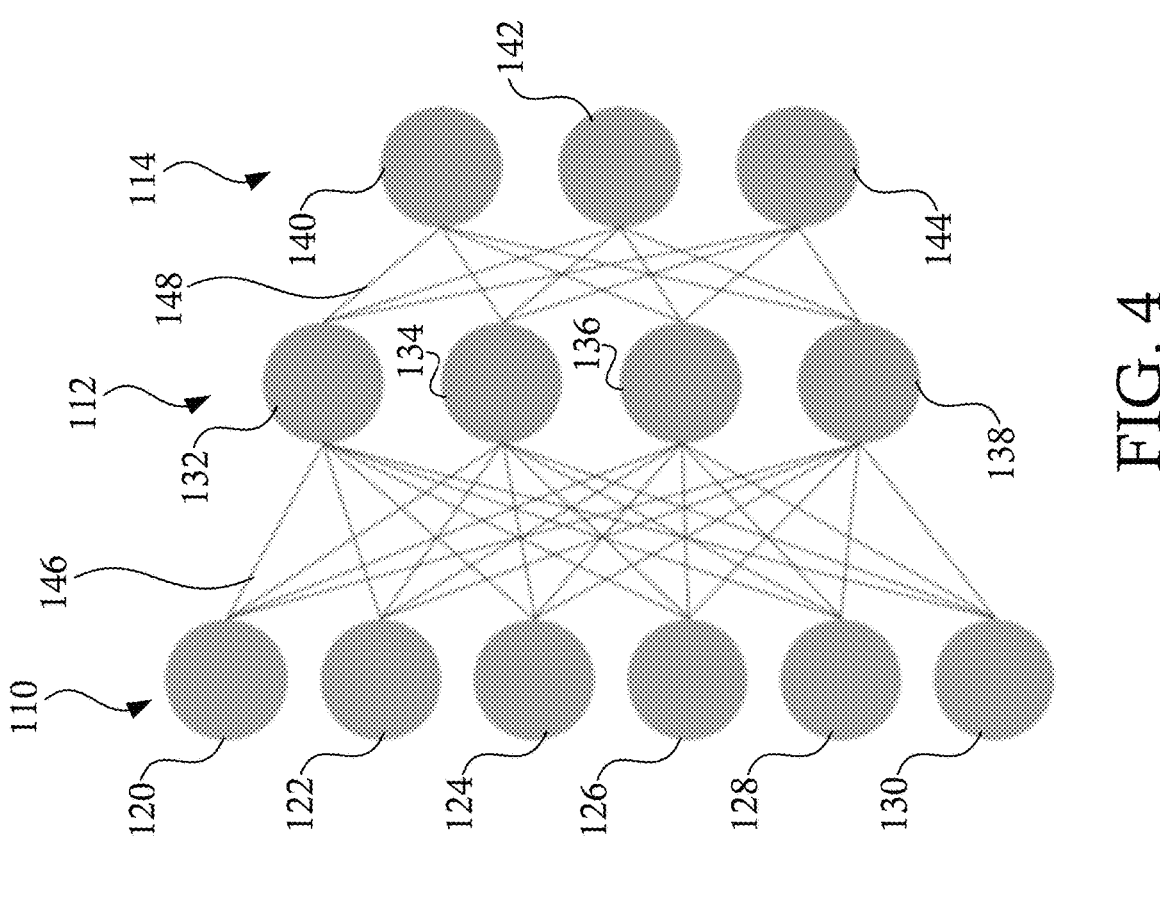
FIG. 4 illustrates an artificial neural network, in accordance with some embodiments.

FIG. 4 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$ or within the interval $[0, 1]$. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein $\gamma$ is a learning rate, and the numbers $$\delta_j^{(n)}$$

can be recursively calculated as $$\delta_j^{(n)} = \left(\sum_k \delta_k^{(n+1)} \cdot w_{j,k}^{(n+1)}\right) \cdot f' \sum_i x_i^{(n)} \cdot w_{i,j}^{(n)}$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

In some embodiments, the neural network 100 is configured, or trained, to generate one or more ETA adjustments or weights for use in generation of a driver-trip total ETA for driver-trip pair prior to route optimization. For example, in some embodiments, the neural network 100 is configured to receive a set of driver features, such as real-time or historical driver features. The neural network 100 can be trained to generate an affinity or reaction score based on the input features and correlate the calculated affinity and/or reaction score to an ETA adjustment. For example, in some embodiments, the neural network 100 is trained to generate an affinity score and correlate the generated affinity score to an ETA adjustment between 0 and 300 seconds, although it will be appreciated that any suitable ETA adjustment can be used. Similarly, the neural network 100 can be configured to generate a weight for use in a total ETA calculation.

Figure 5:
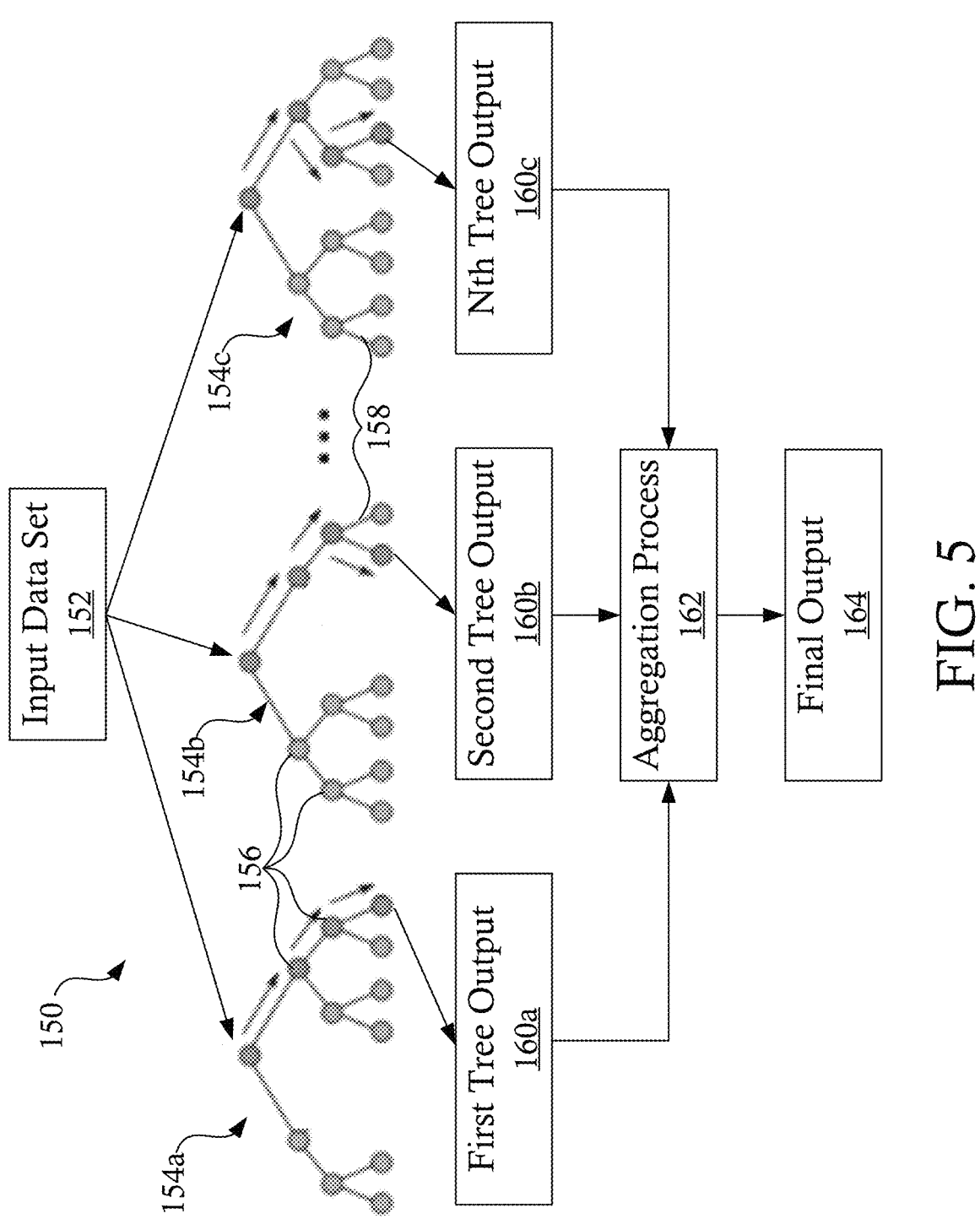
FIG. 5 illustrates a tree-based neural network, in accordance with some embodiments.

FIG. 5 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

In some embodiments, the neural network 150 is configured, or trained, to generate one or more ETA adjustments or weights for use in generation of a driver-trip total ETA for driver-trip pair prior to route optimization. For example, in some embodiments, the neural network 150 is configured to receive a set of driver features, such as real-time or historical driver features. The neural network 150 can be trained to generate an affinity or reaction score based on the input features and correlate the calculated affinity and/or reaction score to an ETA adjustment. For example, in some embodiments, the neural network 150 is trained to generate an affinity score and correlate the generated affinity score to an ETA adjustment between 0 and 300 seconds, although it will be appreciated that any suitable ETA adjustment can be used. Similarly, the neural network 150 can be configured to generate a weight for use in a total ETA calculation.

Figure 7:
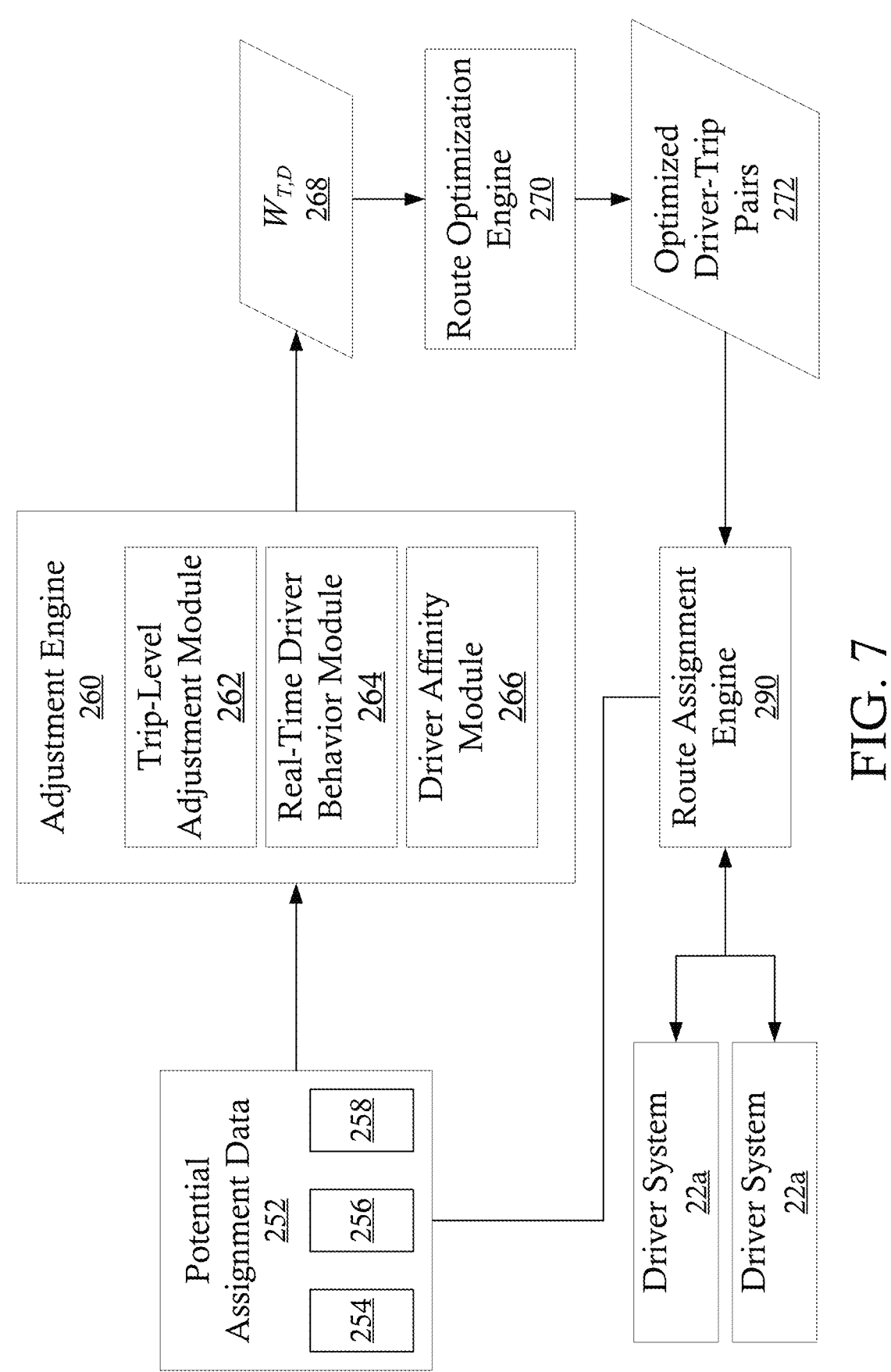
FIG. 7 is a process flow illustrating various steps of the method of generating optimized route assignments, in accordance with some embodiments.

FIG. 6 is a flowchart illustrating a method 200 of generating optimized route assignments for a plurality of driver-trip pairs, in accordance with some embodiments. FIG. 7 is a process flow 250 illustrating various steps of the method 200 of generating optimized route assignments, in accordance with some embodiments. At step 202, potential assignment data 252 is received. The potential assignment data 252 can be received by any suitable system and/or sub-system, such as, for example, a communications interface of a route optimization system 26 and/or a route optimization engine. The potential assignment data 252 includes a set of driver-trip pairs 254 associating a specific driver with a specific trip. The potential assignment data 252 can associate one or more trips with a particular driver and/or can associate one or more drivers with a particular trip such that a route optimization process can select a subset of the driver-trip pairs 254 configured to optimize one or more parameters, as discussed in greater detail below.

For example, in some embodiments, the potential assignment data 252 can include pre-generated driver-trip pairs 254 associating one or more drivers in a set of drivers 256 with one or more trips in a set of trips 258. The set of trips 258 can include deliveries within a specific zone and the set of drivers 256 can include eligible for drivers for at least one of the trips in the set of trips 258. As another example, in some embodiments, the potential assignment data 252 can include a set of drivers 256 and a set of trips 258. A driver-trip module (not illustrated) can be configured to generate driver-trip pairs 254 by matching a subset of drivers in the set of drivers 256 with a subset of trips in the set of trips 258 to generate driver-trip pairs. In some embodiments, the driver-trip pairs 254 are identified based on one or more eligibility criteria associated with the drivers and/or trips.

At step 204, the potential assignment data 252 is provided to an adjustment engine 260. The adjustment engine 260 is configured to generate a weight 268, $w_{T,D}$, for each driver-trip pair 254 in the potential assignment data 252. In some embodiments, weight 268, is applied during a route optimization process, for example, a bipartite matching process for each zone, as discussed in greater detail below. In some embodiments, the adjustment engine 260 can be configured to generate a weight 268 based on, for example, three different driver-trip matching features such as driver-trip features, driver features, and trip features. In some embodiments, the weight is defined as:

$$w_{T,D} = f_{T,D} + f_T + f_D$$

where $w_{T,D}$ is the weight for a specific driver (D) and trip (T) pair and each of $f_{T,D}$, $f_T$, and $f_D$ are trained functions for generating driver-trip, trip, and driver utility function adjustments, respectively.

As another example, in some embodiments, the weight 268 is defined as:

$$W_{T,D} = f_1^{dt}(ETA) + f_2^{dt}(\widehat{p_{dt}}) + f_3^{dt}(S_d, S_T) + f_4^{dt}(n_{rej}) + f_5^{dt}(g) + f_6^{dt}(x, p)$$

where $$f_1^{dt}(ETA)$$

is the ETA from the driver's current location to the pickup location in real-time, $$f_2^{dt}(\widehat{p_{dt}})$$

is a driver-trip affinity function that prioritizes drivers based on predicted acceptance probability for a given trip, $$f_3^{dt}(S_d, S_T)$$

is a best-fit vehicle function that prioritizes vehicle capacity, $$f_4^{dt}(n_{rej})$$

is real-time activity function that de-prioritizes drivers with recent trip rejections or expirations, $$f_5^{dt}(g)$$

is a driver performance function that prioritizes drivers based on past performance, and $$f_6^{dt}(x, p)$$

is a trip function that prioritizes trip with higher priority and higher estimated values. In some embodiments, $$f_1^{dt}, f_2^{dt}, \text{ and } f_3^{dt}$$

are driver-trip level adjustments, $$f_4^{dt}$$

and $$f_5^{dt}$$

are driver-level adjustments, and $$f_6^{dt}$$

is a trip level adjustment.

The driver-trip pairs 254 each include an initial driver-to-location ETA representing an ETA for the driver to arrive from a current location to a pickup location (e.g., to travel from a first geographic position to a second geographic position). The initial driver-to-location ETA for each driver-trip pair 254 can be precalculated and included in the potential assignment data 252 and/or can be calculated after receiving the potential assignment data 252. In some embodiments, the initial driver-to-location ETA can be calculated using location data for each of the driver and an assigned pickup location and one or more mapping algorithms or processes. For example, GPS data and known mapping processes can be used to generate the initial driver-to-location ETA.

In some embodiments, $$f_2^{dt}(\widehat{p_{dt}})$$

is configured to prioritize drivers based on predicted acceptance probability. In some embodiments, predicated acceptance probability can be generated by a trained driver affinity model, as discussed in greater detail below.

$$f_2^{dt}(\widehat{p_{dt}})$$

can be defined as:

$$f_2^{dt}(\widehat{p_{di}}) = \frac{c_{max}}{(s-0.5)^3}\left(\frac{\left\lfloor\frac{n_t}{4}\right\rfloor e^{p_{dt}}}{\sum_t e^{p_{dt}}} - 0.5\right)^3$$

where $p_{dt}$ is the predicted probability of a driver d accepting a trip t, $c_{max}$ is a control parameter configured to control the weight (e.g., the weight of $$f_2^{dt}$$

and/or the overall weight of $w_{T,D}$), and $n_t$ is the number of expired and/or rejected trips for a driver in a predetermined time period. As discussed in greater detail below, in some embodiments, $P_{dt}$ can be generated by a trained driver affinity model.

In some embodiments, $$f_3^{dt}(S_d, S_T)$$

is configured to prioritize a best-fit vehicle. For example, in some embodiments, smaller capacity vehicles are prioritized for smaller trips (e.g., deliveries) to leave large-capacity vehicles available for larger trips. In some embodiments, larger sized vehicles are prioritized for larger trips first.

$$f_3^{dt}(S_d, S_T)$$

can be defined as:

$$f_3^{dt}(S_d, S_T) = \text{idx}(S_d, S_T) * c$$

where $S_T$ is a trip sized based on one or more factors such as weight or volume, $S_d$ is a list of eligible trip sizes based on a driver's vehicle type, idx(x, y) is a function finding an index of element x in list y, and c is a control parameter configured to control the weight (e.g., the weight of $$f_3^{dt}$$

and/or the overall weight of $w_{T,D}$).

In some embodiments, $$f_4^{dt}(n_{rej})$$

is configured to de-prioritize drivers that have rejected and/or not accepted offers in real-time. De-prioritization of drivers based on likelihood of accepting trips indicates a reduction of a driver's likelihood accepting trips and provides one or more additional drivers an opportunity to receive trips.

$$f_4^{dt}(n_{rej})$$

can be defined as:

$$f_4^{dt}(n) = \begin{cases} c_{max}\sqrt{1 - \left(1 - \dfrac{n}{n_{max}}\right)^2}, & n \le n_{max} \\ c_{max}, & n > n_{max} \end{cases}$$

where n is the number of expired and/or rejected trips for a driver in a predetermined time period (e.g., a fixed amount of time prior to the current assignment process), $C_{max}$ is a control parameter configured to control the weight (e.g., the weight of $$f_4^{dt}$$

and/or the overall weight of $w_{T,D}$), and $n_{max}$ is the maximum number of expired and/or rejected trips in a predetermined time period (e.g., a fixed amount of time prior to the current assignment process).

In some embodiments, $$f_5^{dt}(g)$$

is configured to prioritize drivers based on performance, for example, prioritizing drivers with higher customer ratings, lower drop rates, etc. Prioritization of high performing drivers can increase driver engagement and can provide a better experience, as higher rated drivers are likely to provide a higher quality of service.

$$f_5^{dt}(g)$$

can be defined as:

$$f_5^{dt}(g) = c_g$$

where g is a driver's priority group and $c_g$ is a parameter mapping priority group to a weight value. The driver's priority can be based on customer ratings, driver status (e.g., new driver, veteran, etc.), trip drop rate, and/or any other suitable feature. A driver's priority can be generated using a trained model and/or a rule-based process to categorize drivers into groups. $c_g$ can be configured to impact local weights and/or global weights (e.g., the weight of $$f_5^{dt}$$

and/or the overall weight of $w_{T,D}$).

In some embodiments, $$f_6^{dt}(x, p)$$

is configured to prioritize trips having higher priority values. For example, in some embodiments, trips can be categorized as "ASAP" (e.g., as-soon-as-possible) trips, scheduled slotted trips, and scheduled unslotted trips. Although specific embodiments are discussed herein, it will be appreciated that any suitable categories can be used to prioritize trips.

$$f_6^{dt}(x, p)$$

can be defined as:

$$f_6^{dt}(x, p) = \min\left\{-\left(\frac{c_{max}^{(p)} - c_{min}^{(p)}}{2p_{median}^3}\right)(x - p_{median})^3 - \frac{c_{min}^{(p)} + c_{max}^{(p)}}{2}, c_{max}^{(p)}\right\}$$

where x is an estimate trip value, $$c_{max}^{(p)}, c_{min}^{(p)}$$

are weight upper and lower bounds for trips of delivery priority p, and $p_{median}$ is a median trip value for trips of priority p.

$$c_{max}^{(p)}, c_{min}^{(p)}$$

can be configured to impact local weights and/or global weights (e.g., the weight of $$f_6^{dt}$$

and/or the overall weight of $w_{T,D}$).

An adjustment engine 260 can be configured to implement one or more modules (or sub-engines) to generate one or more parameters of $w_{T,D}$. In some embodiments, at step 206, the adjustment engine 260 can implement a trip-level adjustment module 262 to generate a trip-level utility function adjustment or weight, e.g., $$f_6^{dt}.$$

In some embodiments, the trip-level adjustment module 262 is configured to generate a trip-level utility function weight based on trip-specific factors, such as trip priority, time since trip generation, trip location, and/or other trip-specific factors. The trip-level adjustment module 262 can be configured to receive one or more feature inputs and calculate $$f_6^{dt}$$

according to:

$$f_6^{dt}(x, p) = \min\left\{-\left(\frac{c_{max}^{(p)} - c_{min}^{(p)}}{2p_{median}^3}\right)(x - p_{median})^3 - \frac{c_{min}^{(p)} + c_{max}^{(p)}}{2}, c_{max}^{(p)}\right\}$$

In some embodiments, a trip-level adjustment module 262 generates a trip-level utility function adjustment based on the priority of a trip (or the category of a trip), such as mapping trips with a higher priority to a lower weight value. For example, a trip labeled as "high priority," or within a category designated "high priority" such as "express delivery," can have a weight value within a first range, a trip labeled "standard priority," or within a category designated "standard priority" such as "standard delivery," can have a weight value within a second range that is at least partially greater than the first range, and a trip labeled "low priority," or within a category designated "low priority" such as "low cost delivery," can have a weight value within a third range that is at least partially greater than the second range.

In some embodiments, at step 208, the adjustment engine 260 can implement a real-time driver behavior module 264 to generate a driver-level utility function adjustment or weight. In some embodiments, the real-time driver behavior module 264 is configured to generate a driver-level utility function weight based on real-time driver behavior, driver priority grouping, and/or other driver-specific factors. For example, in some embodiments, the real-time driver behavior module 264 includes a trained real-time behavior model configured to receive one or more parameters representative of real-time (e.g., current) driver behavior or classification and generate a driver utility function adjustment, such as, for example, $$f_4^{dt}$$

and/or $$f_5^{dt}$$

discussed above. The trained real-time behavior model can include any suitable trained machine learning model, such as, for example, a trained Bayesian model.

In various embodiments, a Bayesian machine learning model includes a statistical model based on Bayes' Theorem. Bayesian machine learning models can include, but are not limited to, a maximum a posteriori (MAP) model, a Markov chain Monte Carlo (MCMC) model, a Gaussian process, etc. Although embodiments are discussed herein including Bayesian models, it will be appreciated that the real-time adjustment model can include any suitable statistical model.

In some embodiments, the trained real-time behavior model is configured to receive parameters representative of a driver's real-time behavior. Received input parameters for the trained real-time adjustment model can include, but are not limited to, a number of offers presented to a selected driver within a predetermined time period from the current time, a number of expired offers presented to a selected driver within a predetermined time period from the current time, a number of accepted offers presented to driver within a predetermined time period from the current time, and/or any other suitable real-time driver input feature. The real-time driver behavior module 264 modifies the initial driver-to-location ETA of a selected driver-trip pair based on driver-specific determinations.

In some embodiments, at step 210, the adjustment engine 260 can include a driver affinity module 266 configured to determine driver-trip adjustments and/or weights for each driver-trip pair in the potential assignment data 252. For example, in some embodiments, the driver affinity module

266 implements a trained driver affinity model configured to determine one or more parameters of $$f_1^{dt}, f_2^{dt},$$

and/or $$f_3^{dt},$$

as discussed above. The trained driver affinity model can be configured to receive potential assignment data 252, extract one or more input features from the potential assignment data 252 for each driver-trip pair in the potential assignment data 252, and generate function outputs for each of the driver-trip pairs in the potential assignment data 252.

In some embodiments, the trained driver affinity model includes a trained regression and/or classification model. Regression models include trained machine learning models that are configured to estimate a relationship between dependent variables and classification models include trained machine learning models that are configured to classify, or categorize, sets of inputs into two or more predetermined classifications. In some embodiments, the trained driver affinity model includes a trained gradient boosting model, such as a gradient-boosted tree model. A gradient boosted tree model can include a set of decision trees that each represent a prediction model. The output of each of the decision trees can be combined, for example by averaging, polling, and/or other combination mechanisms. The combined outcome of each of the decision trees is provided as an output of the trained gradient-boosted tree model. In some embodiments, the trained driver affinity model includes a regularized gradient boosting model, such as an XGBoost model.

In some embodiments, the trained driver affinity model is configured to classify a selected driver-trip pair based on a set of historical driver reactions. A set of historical driver reactions can include, but is not limited to, accepting an offered trip, declining an offered trip, cancelling an accepted trip, completing an accepted trip, arriving late, arriving early, and/or any other suitable historical trip label. As a non-limiting example, a first driver selected from the set of drivers 256 and a first trip selected from the set of trips 258 constitute a first driver-trip pair. A driver affinity for the first driver is calculated for the first trip, e.g., a likely reaction of the first driver when offered and/or assigned the first trip. The first driver-trip pair can be categorized into one of a plurality of likely outcomes for the driver-trip pair based on the historical reaction labels.

In some embodiments, the driver-trip pair classification includes an affinity score corresponding to the classification. In some embodiments, a driver-trip pair is classified into a particular classification when the affinity score for the given driver-trip pair is within a predetermined range. In some embodiments, a driver-trip pair is assigned a predetermined affinity score based on classification into a particular classification.

At step 212, a set of optimized driver-trip pairs 272 is selected from the set of driver-trip pairs 254. For example, in some embodiments, a route optimization engine 270 is configured to apply a route optimization process including application of a corresponding weight 268 (e.g., $w_{T,D}$) for each of the driver-trip pairs 254. In some embodiments, the route optimization engine 270 is configured to implement a mixed integer programming (MIP) matching process to generate the set of optimized driver-trip pairs 272.

In some embodiments, the MIP matching process includes one or more decision variables, such as, for example, a decision variable determining whether to publish (i.e., transmit) a specific trip t to a specific driver d, e.g., $x_{dt} \in \{0,1\}$, a decision variable determining whether trip t is published to at least one driver, e.g., $y_t \in \{0,1\}$, and/or any other suitable decision variable. The MIP matching process can further include a set of inputs, such as a driver-trip pair weight, $w_{T,D}$, for each driver-trip pair 254 in the potential assignment data 252, a penalty value, $P_t$ for unassigned trips, a set of eligible trips $T_d$ for a driver d, a set of eligible drivers $D_t$ for trip t, and/or any other suitable inputs.

At step 214, each trip in the set of optimized driver-trip pairs 272 is transmitted to a driver system 22a, 22b corresponding to a driver that was selected for that trip. For example, in some embodiments, the route optimization engine 270 can generate a set of optimized driver-trip pairs 272 including the driver-trip pairs illustrated in FIG. 3B. After selecting the set of optimized driver-trip pairs 272, a route assignment engine 290 transmits data corresponding a first delivery to the fifth driver 84e, data corresponding to the second delivery to the first driver 84a, data corresponding to the third delivery to the third driver 84c, and data corresponding to the fourth delivery to the second driver 84b.

At step 216, the route assignment engine 290 can receive an indication of either acceptance or non-acceptance for each of the optimized driver-trip pairs 272. For example, in some embodiments, a transmitted trip, e.g., delivery, can be accepted by a driver utilizing a driver system 22a, 22b indicating the driver will pickup the delivery from the corresponding pickup location and transport them to the delivery location. Alternatively, a driver can reject the trip, indicating they do not wish to perform the selected delivery. In addition, in some embodiments, a transmitted trip assignment can have a time limit, e.g., a time within which the trip assignment can be accepted. If the trip assignment is not accepted within the predetermined time limit, a notification that the trip was not accepted can be provided to the route assignment engine 290.

In some embodiments, rejected, expired, and/or unassigned trips in the set of trips 258 can be included a second set of potential assignment data and provided to the adjustment engine 260. In addition, drivers in the set of drivers 256 that did not accept a trip can be included in the second set of potential assignment data. The potential set of potential assignment data can include only the rejected, expired, and/or unassigned trips of the prior set of potential assignment data 252 and/or can include trips and/or drivers not present in the prior set of potential assignment data 252. It will be appreciated that adjustment engine 260 can perform the method 200 of generating optimized route assignments multiple times to assign all trips in a set of trips 258.

Figure 8:
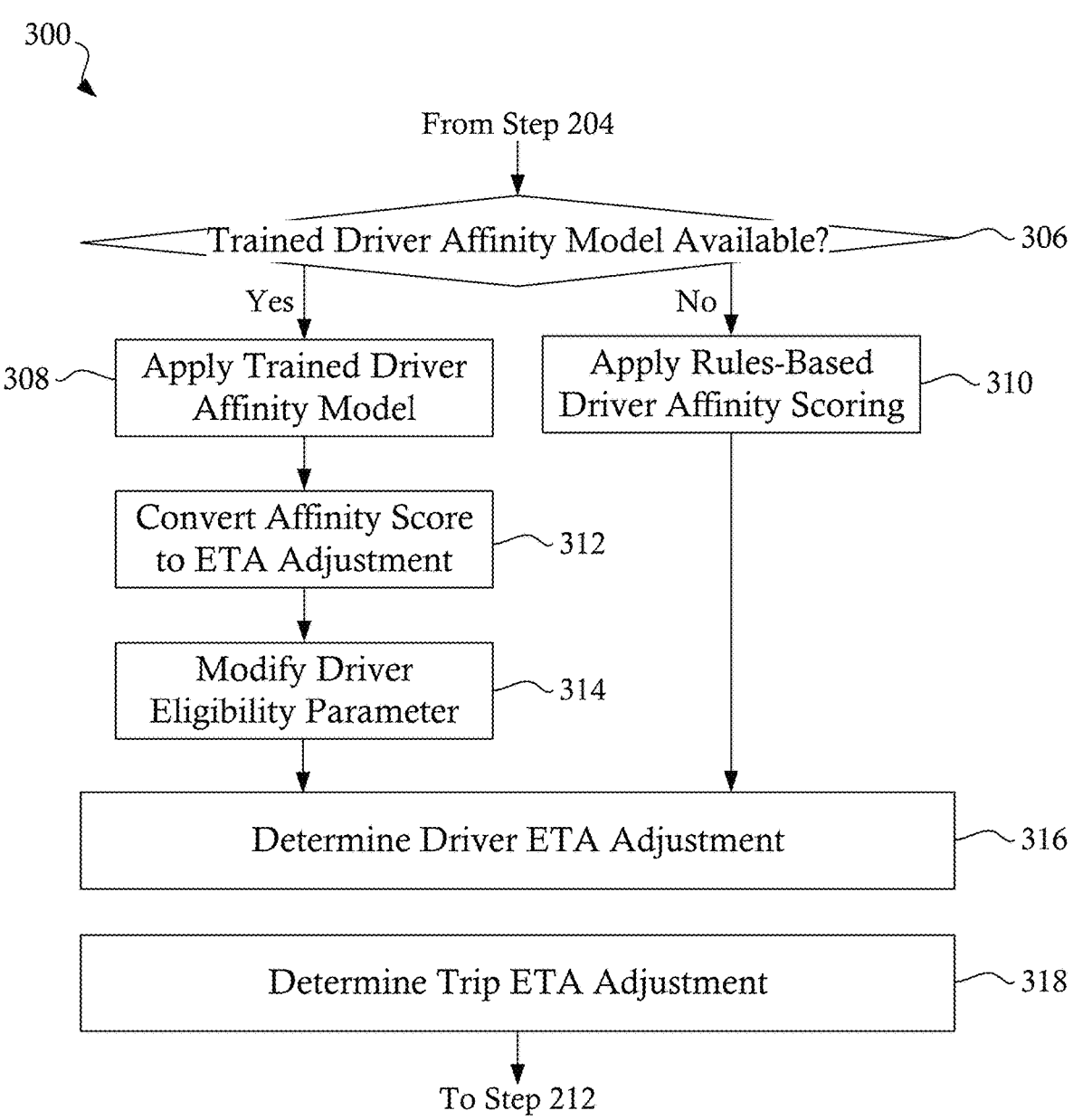
FIG. 8 is a flowchart illustrating a method of generating optimized route assignments for a plurality of driver-trip pairs, in accordance with some embodiments.
Figure 9:
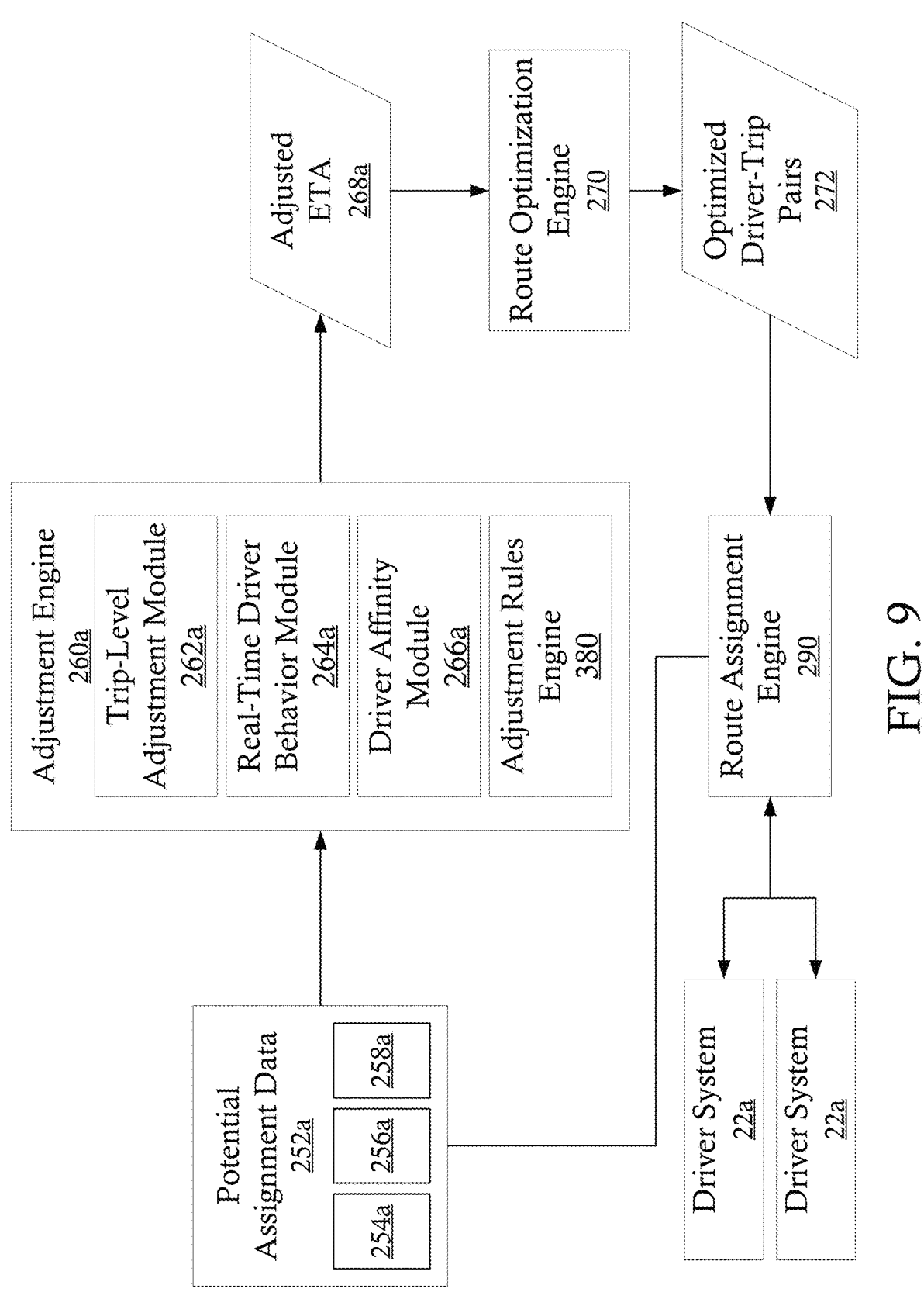
FIG. 9 is a process flow illustrating various steps of the method of generating optimized route assignments, in accordance with some embodiments.

FIG. 8 is a flowchart illustrating a portion of a method 300 of generating optimized route assignments for a plurality of driver-trip pairs, in accordance with some embodiments. FIG. 9 is a process flow 350 illustrating various steps of the method 300 of generating optimized route assignments, in accordance with some embodiments. The method 300 and the process flow 350 are similar to the method 200 and the process flow 250 discussed above, and similar description is not repeated herein. Method 300 begins with steps 202 and 204 similar to method 200.

At step 306, the adjustment engine 260a performs a check to determine if a trained driver affinity model is available for the zone associated with a current driver-trip pair. If a trained driver affinity model is available, the method 300 proceeds to step 308. If a trained driver affinity model 266a is not available, the method 300 proceeds to step 310.

At step 308, the adjustment engine 260a applies a trained driver affinity model 266a to calculate a driver-trip ETA adjustment for each driver-trip pair in the potential assignment data 252a. The trained driver affinity model 266a can be configured to receive the potential assignment data 252a, extract one or more input features from the potential assignment data 252a for each driver-trip pair in the potential assignment data 252a, and generate a driver-trip ETA adjustment for each of the driver-trip pairs in the potential assignment data 252a.

In some embodiments, a trained driver affinity model 266a includes a trained machine learning model configured to generate a driver-trip affinity score. The driver-trip affinity score predicts the probability of a given driver, e.g., a first driver $d_1$ selected from the set of drivers 256a, will accept an offer for a trip, e.g., a first trip $t_1$ selected from the set of trips 258a. The trained driver affinity model 266a is configured to convert the set of input features, e.g., a set including one or more driver features and/or one or more trip features, into a driver affinity score.

In some embodiments, the trained driver affinity model 266a is configured to extract a set of feature inputs from a set of potential assignment data 252a. For example, in some embodiments, a feature extraction engine is configured to extract the set of input features from the potential assignment data 252a. The feature extraction engine is configured to identify initial and/or derived values included in the potential assignment data 252a. Extracted input features represent informative and non-redundant values within the potential assignment data that are configured to facilitate subsequent generation of the driver affinity score.

The set of input features can include any suitable input features related to and/or predictive of a driver affinity score for each trip. For example, the input features can include, but are not limited to, historical features such as prior trip completions, prior trip acceptance, driver ratings, and/or any other suitable features.

In some embodiments, the trained driver affinity model 266a includes a trained regression and/or classification model. Regression models include trained machine learning models that are configured to estimate a relationship between dependent variables and classification models include trained machine learning models that are configured to classify, or categorize, sets of inputs into two or more predetermined classifications. In some embodiments, the trained driver affinity model 266a includes a trained gradient boosting model, such as a gradient-boosted tree model. A gradient boosted tree model can include a set of decision trees that each represent a prediction model. The output of each of the decision trees can be combined, for example by averaging, polling, and/or other combination mechanisms. The combined outcome of each of the decision trees is provided as an output of the trained gradient-boosted tree model. In some embodiments, the trained driver affinity model includes a regularized gradient boosting model, such as an XGBoost model.

In some embodiments, the trained driver affinity model 266a is configured to classify a selected driver-trip pair based on a set of historical driver reactions. A set of historical driver reactions can include, but is not limited to, accepting an offered trip, declining an offered trip, cancelling an accepted trip, completing an accepted trip, arriving late, arriving early, and/or any other suitable historical trip label. As a non-limiting example, a first driver $d_1$ selected from the set of drivers 256a and a first trip $t_1$ selected from the set of trips 258a constitute a first driver-trip pair. A trip affinity for the first driver $d_1$ is calculated for the first trip $t_1$, e.g., a likely reaction of the first driver $d_1$ when offered and/or assigned the first trip $t_1$. The first driver-trip pair can be categorized into one of a plurality of likely outcomes for the driver-trip pair based on the historical reaction labels. In some embodiments, the driver-trip pair classification provides a predetermined driver affinity score corresponding to the classification. In some embodiments, a driver-trip pair is classified into a particular classification when the driver affinity score for the given driver-trip pair is within a predetermined range.

At step 312, the adjustment engine 260a converts a driver affinity score to an ETA adjustment for the given driver-trip pair. For example, in some embodiments, driver affinity score can include a score within a predetermined range, such as 0-1. The adjustment engine 260a can project the driver affinity scores onto a time space having a predetermined and/or calculated range of values. For example, in some embodiments, a driver affinity score within a range of 0-1 can be projected onto a time space having a range of 0-300 seconds. The time space represents an ETA adjustment to be added to an ETA for the selected driver-trip pair.

In some embodiments, the projection of the driver affinity score to the time space can include an opposite correlation. For example, in some embodiments, a higher driver affinity score can be projected (e.g., correlate) to a lower ETA adjustment. A higher driver affinity score can represent a higher likelihood that a driver will accept and complete a given trip within predetermined parameters (e.g., within a selected delivery window for the selected trip). The trained driver affinity model 266a is configured to represent this higher likelihood (e.g., higher affinity score) as a smaller adjustment to the ETA for the given driver-trip pair. Conversely, a lower driver affinity score, representing a high likelihood that a driver will not accept or complete a given trip, will have a higher ETA adjustment added to the driver-trip pair.

At optional step 314, the adjustment engine 260a can modify a driver eligibility parameter for a selected driver-trip pair. For example, in some embodiments, a driver eligibility parameter can include a binary parameter indicating a selected driver, e.g., a first driver $d_1$, is either eligible or not-eligible for a selected trip, e.g., a first trip $t_1$. If the driver affinity score for a selected driver-trip pair is below a predetermined threshold, the adjustment engine 260a can modify the driver eligibility parameter for that trip from "eligible" to "non-eligible." As another example, in some embodiments, a driver eligibility parameter can include a range of values, such as, for example, "priority," "primary," "secondary," "back-up," and/or any other suitable values. If the driver affinity score for a selected driver-trip pair is within a predetermined range, the adjustment engine 260a can assign the driver eligibility parameter to a predetermined value corresponding one of the potential classification categories. For example, a high driver affinity score can result in assignment of "priority" for the driver-trip pair, while a low driver affinity score can result in assignment of "secondary" or "not-eligible."

As discussed above, if at step 306 the adjustment engine 260a determines that a driver affinity model 266a is not available for a given zone, the method 300 proceeds to step 310 and the adjustment engine 260a implements an adjustment rules engine 380 configured to generate driver-trip ETA adjustments for a driver-trip pair using a rules-based process. For example, in some embodiments, a rules-based process can apply a predetermined set of rules, e.g., conditional rules, evaluation rules, etc. to generate ETA adjustments for a selected driver-trip pair. A system and method including a rules-based process for driver-trip affinity pairing is described in greater detail in U.S. Pat. No. 11,282,027, issued Mar. 22, 2022 and entitled "System and Method of Delivery Assignment," which was previously incorporated herein by reference in its entirety.

In some embodiments, the adjustment rules engine 380 includes default adjustment rules for generating an ETA adjustment. For example, in some embodiments, the adjustment rules engine 380 can be configured to generate a driver-trip ETA adjustment based on the number of trips previously accepted, denied, completed, or abandoned by a driver, the length of time that the driver has been associated with a platform, driver ratings, and/or any other suitable historical driver data.

At step 316, the adjustment engine 260a implements a driver-level ETA adjustment process to determine a driver ETA adjustment. In some embodiments, a driver-level ETA adjustment includes an ETA adjustment based on real-time driver behavior, driver priority grouping, and/or other driver-specific factors. For example, in some embodiments, the adjustment engine 260a implements a trained real-time adjustment model configured to receive one or more parameters representative of real-time (e.g., current) driver behavior or classification and generate a driver ETA adjustment. The trained real-time adjustment model can include any suitable trained machine learning model. For example, in some embodiments, the trained real-time adjustment model includes a trained Bayesian model.

A Bayesian machine learning model can include a statistical model based on Bayes' Theorem. Bayesian machine learning models can include, but are not limited to, a maximum a posteriori (MAP) model, a Markov chain Monte Carlo (MCMC) model, a Gaussian process, etc. Although embodiments are discussed herein including Bayesian models, it will be appreciated that the real-time adjustment model can include any suitable statistical model.

In some embodiments, the trained real-time adjustment model is configured to receive parameters representative of a driver's real-time behavior. Received input parameters for the trained real-time adjustment model can include, but are not limited to, a number of offers presented to a selected driver within a predetermined time period from the current time, a number of expired offers presented to a selected driver within a predetermined time period from the current time, a number of accepted offers presented to driver within a predetermined time period from the current time, and/or any other suitable real-time driver input feature.

A driver level ETA adjustment modifies an ETA of a selected driver-trip pair based on driver-specific determinations. In some embodiments, the driver level ETA adjustment is applied to a previously modified ETA (e.g., based on a driver-trip ETA adjustment) of a driver-trip pair. In some embodiments, the driver level ETA adjustment can be combined with (e.g., added to) previously calculated ETA adjustments, such as a driver-trip ETA adjustment, prior to being applied to the ETA of a driver-trip pair. Alternatively, the driver level ETA adjustment can be applied sequentially and/or simultaneously to the driver-trip pair with the driver-trip ETA adjustment, and can be applied in any suitable order.

At step 318, the adjustment engine 260a implements a trip-level ETA adjustment process to determine a trip ETA adjustment. In some embodiments, a trip level ETA adjustment includes ETA adjustments based on trip-specific factors, such as trip priority, time since trip generation, trip location, etc. For example, in some embodiments, the adjustment engine 260a implements a trip-level ETA adjustment process that generates an trip level ETA adjustment to increase a trip ETA when the priority of a trip is below a threshold value or categorization. For example, a trip labeled as "high priority" can receive a trip level ETA adjustment of 0, a trip labeled "standard priority" can receive a small trip level ETA adjustment, and a trip labeled "low priority" can receive a larger trip level ETA adjustment. It will be appreciated that the actual values of the ETA adjustments for each trip label and/or trip parameter can be adjusted to reflect to desired operation of the adjustment engine 260a.

It will be appreciated that the actual values of the ETA adjustment 268a for each trip and/or trip parameter can be adjusted to reflect to desired operation of the adjustment engine 260a and/or the overall ETA of the specific trip. For example, a set of trips including initial driver-to-location ETAs defined in minutes can include ETA adjustments applied in seconds or minutes while a set of trips including initial driver-to-location ETAs defined in hours can have ETA adjustments applied in minutes or hours. It will be appreciated that the scope of the ETA adjustments can be selected to provide suitable tuning of the route optimization engine, in accordance with various embodiments.

A trip level ETA adjustment modifies an ETA of a selected driver-trip pair based on trip-specific determinations. In some embodiments, the trip level ETA adjustment is applied to a previously modified ETA (e.g., based on a driver-trip ETA adjustment and/or driver-level ETA adjustment) of a driver-trip pair. In some embodiments, the trip level ETA adjustment can be combined with (e.g., added to) previously calculated ETA adjustments, such as a driver-trip ETA adjustment and/or a driver ETA adjustment, prior to being applied to the ETA of a driver-trip pair. Alternatively, the trip level ETA adjustment can be applied sequentially and/or simultaneously to the driver-trip pair with the driver-trip ETA adjustment and/or the driver ETA adjustment, and can be applied in any suitable order. After step 318, the method 300 proceeds to step 212 as described above in conjunction with method 200.

Figure 10:
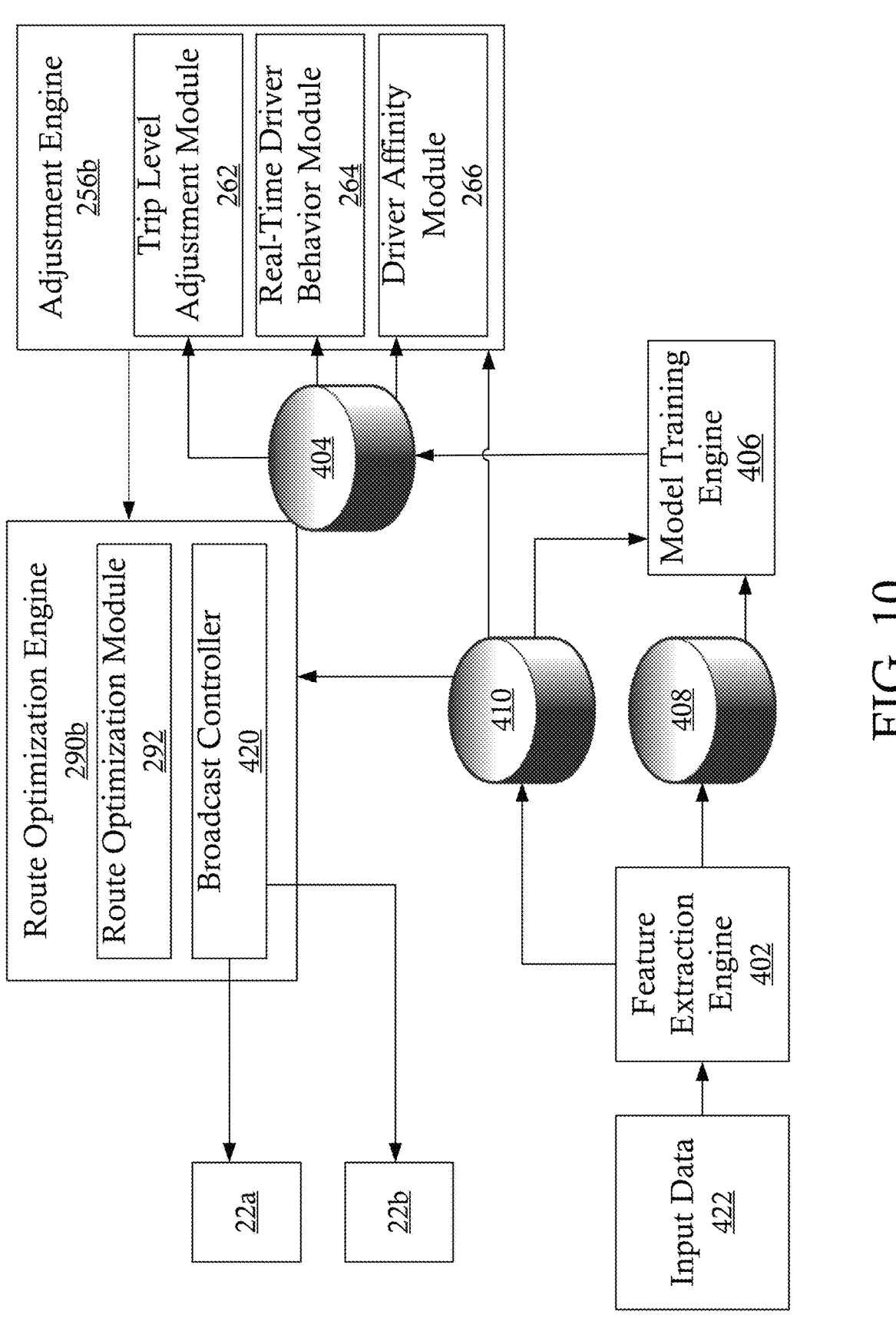
FIG. 10 is an architecture diagram illustrating various elements of a system configured to provide optimized route assignments, in accordance with some embodiments.

FIG. 10 illustrates a route assignment architecture 400 configured to provide optimized route assignments, in accordance with some embodiments. As illustrated in FIG. 10, in some embodiments, a route assignment architecture 400 can include an adjustment engine 256b, a route optimization engine 290b, and a feature extraction engine 402. In some embodiments, the adjustment engine 256b is configured to implement one or more of a trip-level adjustment module 262, a real-time driver behavior module 264, and/or a driver affinity module 266. In some embodiments, the adjustment engine 256b obtains one or more trained modules and/or models from a model store 404. The model store 404 can include any suitable non-transitory storage mechanism, such as, for example, a database, distributed database, distributed cache, and/or other storage mechanism.

In some embodiments, each trained model stored in the model store 404 is generated by a training engine 406. The training engine 406 is configured to receive a set of training data, for example from a driver-trip historical feature store 408 and/or a driver feature store 410, and iteratively train one or more models, such as a real-time driver behavior model implemented by a real-time driver behavior module 264, a driver affinity model implemented by a driver affinity module 266, and/or any other suitable model. A feature extraction engine 402 can be configured to extract suitable features, such as driver-trip features and/or driver features, from input data 422 (e.g., implement a consumer service) and store the extracted features in the relevant databases. In some embodiments, the feature extraction engine 402 can include one or more consumer modules, such as, for example Kafka consumer modules.

In some embodiments, the route optimization engine 290b is configured to receive an input from the adjustment engine 256b. The input can be provided through any suitable mechanism, such as, for example, an application programming interface (e.g., a REST API). The route optimization engine 290b can implement a route optimization module 292. The route optimization module 292 can be configured to perform one or more functions previously described as being performed by the adjustment engine 256b, such as, for example, implementing a trained real-time behavioral model and/or trip level-adjustment module.

In some embodiments, the route optimization engine 290b is configured to transmit trip data to each driver system 22a, 22b associated with a driver selected by the route optimization module 292. Trip data can be provided via any suitable mechanism, such as, for example, a broadcast controller 420.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a non-transitory memory;

a transceiver configured to receive potential assignment data comprising data representative of a plurality of drivers and a plurality of trips;

an adjustment engine configured to:

receive a plurality of driver-trip pairs each including a driver selected from the plurality of drivers and a trip selected from the plurality of trips; and determine a weight for each of the driver-trip pairs, wherein the weight is determined based on respective weights of at least one driver-trip feature, at least one driver feature, and at least one trip feature, wherein:

the at least one driver-trip feature includes driver affinity score based, in part, on a driver probability to accept a respective trip, the at least one driver feature including real-time driver behavior features representative of driver declined trips relative to maximum declined trips in a predetermined time period, and the at least one trip feature includes a trip priority feature; and a route optimization engine configured to:

select a set of optimal driver-trip pairs from the plurality of driver-trip pairs based on a bipartite matching process including the weight for each of the driver-trip pairs, wherein the set of optimal driver-trip pairs minimizes a total estimated time of arrival to a pickup location for each trip in the plurality of trips;

transmit trip data for each trip in the plurality of trips to a corresponding device associated with a corresponding driver paired with each trip in the set of optimal driver-trip pairs;

receive from the corresponding device an indication of either acceptance or non-acceptance for each trip in the set of optimal driver-trip pairs; and in response to receiving an indication of non-acceptance for a subset of the set of optimal driver-trip pairs that is provided after a predetermined time limit, automatically:

providing the subset of the set of optimal driver-trip pairs to the adjustment engine, and broadcasting corresponding trip data to devices of the plurality of drivers.

2. The system of claim 1, wherein the adjustment engine is configured to generate a trip-specific weight component of the weight based on the trip priority feature.

3. The system of claim 1, wherein the adjustment engine is configured to generate a driver-specific weight component of the weight based on the real-time driver behavior features.

4. The system of claim 3, wherein the adjustment engine is configured to implement a trained real-time behavior model to determine the driver-specific weight component.

5. The system of claim 1, wherein the adjustment engine is configured to generate a driver-trip weight component of the weight based on the driver affinity score.

6. The system of claim 5, wherein the adjustment engine is configured to implement a trained driver affinity model to generate the driver affinity score.

7. The system of claim 1, wherein the weight for each of the driver-trip pairs is defined as:

$$W_{T,D} = f_1^{dt}(ETA) + f_2^{dt}(\widehat{p_{dt}}) + f_3^{dt}(S_d, S_T) + f_4^{dt}(n_{rej}) + f_5^{dt}(g) + f_6^{dt}(x, p)$$

where $$f_1^{dt}(ETA)$$

is an estimated time or arrival from a current location associated with the driver to a pickup location associated with the trip, $$f_2^{dt}(\hat{p}_{dt})$$

is a predicted probability of a driver d accepting a trip t, $$f_3^{dt}(S_d, S_T)$$

is a best-fit vehicle function, $$f_4^{dt}(n_{rej})$$

is real-time activity function, $$f_5^{dt}(g)$$

is a driver performance function, and $$f_6^{dt}(x, p)$$

is a trip function.

8. The system of claim 7, wherein $$f_2^{dt}(\hat{p}_{dt})$$

is defined as:

$$f_2^{dt}(\widehat{p_{dt}}) = \frac{c_{max}}{(s-0.5)^3}\left(\left[\frac{n_t}{4}\right]\frac{e^{p_{dt}}}{\sum_t e^{p_{dt}}} - 0.5\right)^3$$

where $c_{max}$ a control parameter configured to control the weight and $n_t$ is a number of expired or rejected trips for the driver in a predetermined time period.

9. The system of claim 7, wherein $$f_4^{dt}(n_{rej})$$

is defined as:

$$f_4^{dt}(n) = \begin{cases} c_{max}\sqrt{1-\left(1-\frac{n}{n_{max}}\right)^2}, & n \le n_{max} \\ c_{max}, & n > n_{max} \end{cases}$$

where n is a number of expired or rejected trips for the driver in a predetermined time period, $c_{max}$ a control parameter configured to control the weight, and $n_{max}$ a maximum number of expired or rejected trips in a predetermined time period.

10. The system of claim 7, wherein $$f_5^{dt}(g)$$

is defined as:

$$f_5^{dt}(g) = c_g$$

where g is a priority group and $c_g$ maps the priority group to a weight value.

11. A computer-implemented method, comprising:

receiving, via a transceiver, potential assignment data comprising data representative of a plurality of drivers and a plurality of trips;

receiving, at an adjustment engine, a plurality of driver-trip pairs each including a driver selected from the plurality of drivers and a trip selected from the plurality of trips;

determining, by the adjustment engine, a weight for each of the driver-trip pairs, wherein the weight is determined based on respective weights of at least one driver-trip feature, at least one driver feature, and at least one trip feature, wherein:

the at least one driver-trip feature includes driver affinity score based, in part, on a driver probability to accept a respective trip, the at least one driver feature including real-time driver behavior features representative of driver declined trips relative to maximum declined trips in a predetermined time period, and the at least one trip feature includes a trip priority feature;

selecting, by a route optimization engine, a set of optimal driver-trip pairs from the plurality of driver-trip pairs based on a bipartite matching process including the weight for each of the driver-trip pairs, wherein the set of optimal driver-trip pairs minimizes a total estimated time of arrival to a pickup location for each trip in the plurality of trips;

transmitting, via the transceiver, trip data for each trip in the plurality of trips to a corresponding device associated with a corresponding driver paired with each trip in the set of optimal driver-trip pairs;

receiving, via the transceiver, from the corresponding device an indication of either acceptance or non-acceptance for each trip in the set of optimal driver-trip pairs; and in response to receiving an indication of non-acceptance for a subset of the set of optimal driver-trip pairs that is provided after a predetermined time limit, automatically providing the subset of the set of optimal driver-trip pairs to the adjustment engine, and broadcasting corresponding trip data to devices of the plurality of drivers.

12. The computer-implemented method of claim 11, wherein the adjustment engine is configured to generate a trip-specific weight component of the weight based on the priority feature.

13. The computer-implemented method of claim 11, wherein the adjustment engine is configured to generate a driver-specific weight component of the weight based on the real-time driver behavior features.

14. The computer-implemented method of claim 13, wherein the adjustment engine is configured to implement a trained real-time behavior model to determine the driver-specific weight component.

15. The computer-implemented method of claim 11, wherein the adjustment engine is configured to generate a driver-trip weight component of the weight based on the driver affinity score.

16. The computer-implemented method of claim 15, wherein the adjustment engine is configured to implement a trained driver affinity model to generate the driver affinity score.

17. A non-transitory computer-readable medium having instructions stored thereon, wherein the instructions, when executed by at least one processor, cause a device to perform operations comprising:

receiving, via a transceiver, potential assignment data comprising data representative of a plurality of drivers and a plurality of trips;

receiving, at an adjustment engine, a plurality of driver-trip pairs each including a driver selected from the plurality of drivers and a trip selected from the plurality of trips;

determining, by the adjustment engine, a weight for each of the driver-trip pairs, wherein the weight is determined based on respective weights of at least one driver-trip feature, at least one driver feature, and at least one trip feature, wherein:

the at least one driver-trip feature includes driver affinity score based, in part, on a driver probability to accept a respective trip, the at least one driver feature including real-time driver behavior features representative of driver declined trips relative to maximum declined trips in a predetermined time period, and the at least one trip feature includes a trip priority feature;

selecting, by a route optimization engine, a set of optimal driver-trip pairs from the plurality of driver-trip pairs based on a bipartite matching process including the weight for each of the driver-trip pairs, wherein the set of optimal driver-trip pairs minimizes a total estimated time of arrival to a pickup location for each trip in the plurality of trips;

transmitting, via the transceiver, trip data for each trip in the plurality of trips to a corresponding device associated with a corresponding driver paired with each trip in the set of optimal driver-trip pairs;

receiving, via the transceiver, from the corresponding device an indication of either acceptance or non-acceptance for each trip in the set of optimal driver-trip pairs; and in response to receiving an indication of non-acceptance for a subset of the set of optimal driver-trip pairs that is provided after a predetermined time limit, automatically providing the subset of the set of optimal driver-trip pairs to the adjustment engine, and broadcasting corresponding trip data to devices of the plurality of drivers.

18. The non-transitory computer-readable medium of claim 17, wherein the weight for each of the driver-trip pairs is defined as:

$$W_{T,D} = f_1^{dt}(ETA) + f_2^{dt}(\hat{p_{dt}}) + f_3^{dt}(S_d, S_T) + f_4^{dt}(n_{rej}) + f_5^{dt}(g) + f_6^{dt}(x, p)$$

where $$f_1^{dt}(ETA)$$

is an estimated time of arrival from a current location associated with the driver to a pickup location associated with the trip, $$f_2^{dt}(\hat{p_{dt}})$$

is a predicted probability of a driver d accepting a trip t, $$f_3^{dt}(S_d, S_T)$$

is a best-fit vehicle function, $$f_4^{dt}(n_{rej})$$

is real-time activity function $$f_5^{dt}(g)$$

is a driver performance function, and $$f_6^{dt}(x, p)$$

is a trip function.

19. The non-transitory computer-readable medium of claim 18, wherein $$f_2^{dt}(\hat{p}_{dt})$$

is defined as:

$$f_2^{dt}(\hat{p}_{di}) = \frac{c_{max}}{(s - 0.5)^3} \left( \frac{\left\lfloor \frac{n_t}{4} \right\rfloor e^{p_{dt}}}{\sum_t e^{p_{dt}}} - 0.5 \right)^3$$

where $c_{max}$ a control parameter configured to control the weight and $n_t$ is a number of expired or rejected trips for the driver in a predetermined time period.

20. The non-transitory computer-readable medium of claim 18, wherein $$f_4^{dt}(n_{rej})$$

is defined as:

$$f_4^{dt}(n) = \begin{cases} c_{max} \sqrt{1 - \left(1 - \frac{n}{n_{max}}\right)^2}, & n \leq n_{max} \\ c_{max}, & n > n_{max} \end{cases}$$

where n is a number of expired or rejected trips for the driver in a predetermined time period, $c_{max}$ a control parameter configured to control the weight, and $n_{max}$ a maximum number of expired or rejected trips in a predetermined time period.

\* \* \* \* \*